Nov. 23, 1954        F. STABLES        2,695,108
CENTRALIZING AND TRAVERSING DEVICE FOR ROCKER SHOVELS
Filed Dec. 8, 1953
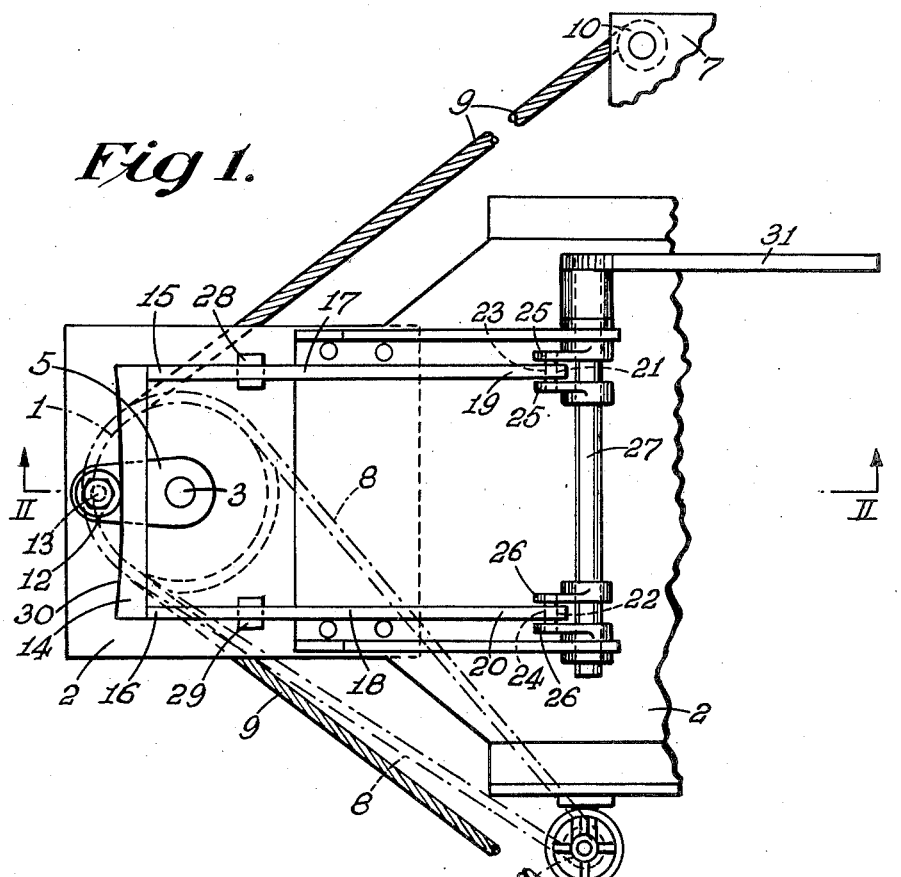
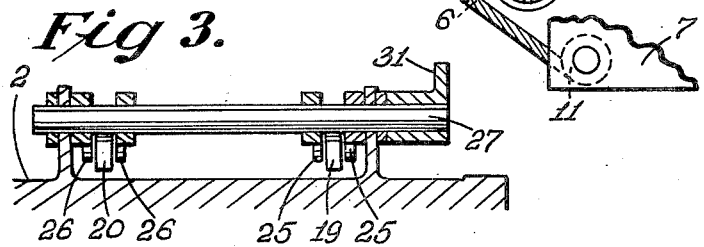
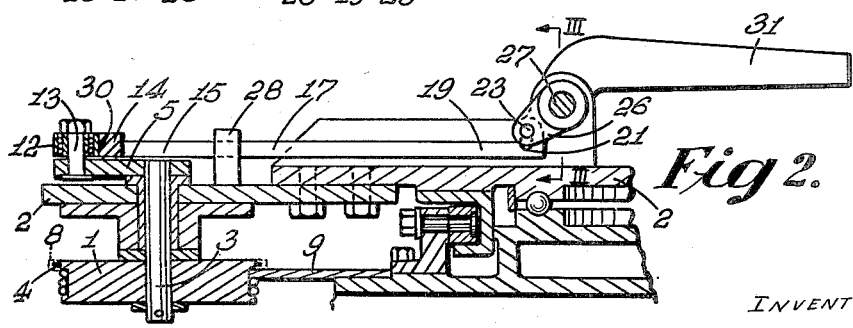
INVENTOR:
FRED STABLES
By Young, Emery & Thompson
Att'ys.

United States Patent Office 2,695,108
Patented Nov. 23, 1954

2,695,108

CENTRALIZING AND TRAVERSING DEVICE FOR ROCKER SHOVELS

Fred Stables, Johannesburg, Transvaal, Union of South Africa, assignor to C. C. Taylor and Company (Proprietary) Limited, Johannesburg, Transvaal, Union of South Africa Application December 8, 1953, Serial No. 396,997

Claims priority, application Union of South Africa January 20, 1953

3 Claims. (Cl. 214—132)

This invention relates to a centralising device for rocker shovels.

In shovels of this type, the bucket is secured to a rocker arm and it is arranged to be raised from the digging position and swung upwards and over the frame to discharge its load behind the frame. Provision is made for traversing the bucket and its mounting in the horizontal plane and it is necessary to ensure that the traversing device is centralised during the upward and rearward movement of the bucket so that the load may be discharged directly behind the shovel.

The object of the present invention is to provide a simple and effective centralising and traversing device.

In accordance with the invention, a centralising and traversing device for a rocker shovel comprises a flanged drum rotatably mounted on the turntable on a vertical axis; a rope coiled round the drum and having its ends secured to the frame at opposite sides thereof; manual or other means for rotating the drum to traverse the turntable in the horizontal plane; a crank mounted concentric with the drum and rotatable therewith, said crank being arranged to lie on the longitudinal axis of the shovel when the turntable is centralised; a roller rotatably mounted on a vertical axis on the free end of the crank; a centralising framework co-operating with the aforesaid roller and adapted to be moved longitudinally relative to the main frame; and lever means actuated by the rocker arm to urge the centralising framework forward to centralise the crank and therefore the rope drum and turntable.

Traversing may be effected by means of a chain wheel associated with the drum and rotatable therewith and a manually rotatable sprocket wheel mounted on the turntable, the sprocket and chain wheels being connected by a sprocket chain.

The centralising framework may comprise a transverse member uniting the forward end of two parallel arms, the rearward ends of which are provided with vertically disposed slots by means of which the framework is mounted on crank pins associated with crank arms carried by a transverse shaft, said shaft being rotatable by lever means actuated by the rocker arm to throw the crank arms forward and extend the centralizing framework forward to the limit of its travel and allow the transverse member to centralise the crank.

The invention will be further described, purely by way of example, with reference to the accompanying drawings in which:

Fig. 1 is a plan view of a centralising and traversing device according to the invention.

Fig. 2 is cross-section on the line II—II in Fig. 1.

Fig. 3 is a cross-section on the line III—III in Fig. 2.

Referring to the drawings, the rope drum 1 is mounted on the turntable 2 by means of a vertical shaft 3. A chain wheel 4 and a crank 5 are also mounted on the shaft 3 and are rotatable therewith and with the rope drum 1. A hand-operated sprocket wheel 6 is supported on the turntable 2 and the sprocket wheel 6 and chain wheel 4 are connected by a sprocket chain 8. A wire rope 9 is coiled round the drum 1 and its ends are secured to the main frame 7 at 10 and 11 respectively. Traversing of the turntable 2 to enable the shovel to dig to one side of the machine is thus effected by rotating the sprocket wheel 6. A roller 12 is rotatably mounted on a vertical pin 13 on the free extremity of the crank 5, which latter is arranged to lie on the longitudinal axis of the main frame 7 when the turntable 2 is in its central position.

The centralising device essentially comprises a transverse member 14 in contact with the roller 12 and uniting the forward ends 15 and 16 of parallel arms 17 and 18. The rearward ends 19 and 20 of the arms 17 and 18 are provided with vertical slots 21 and 22 by means of which the device is mounted on crank pins 23 and 24 associated with crank arms 25 and 26 fixed to a transverse shaft 27. The arms 17 and 18 pass through guide blocks 28 and 29 and the leading face 30 of the transverse member 14 is slightly concave. The shaft 27 is rotatable by means of a rearwardly extending lever 31.

When it is desired to traverse the turntable 2, the lever 31 is raised, thus retracting the transverse member 14 to its extreme rearward position. The crank 5 is now free to swing in the horizontal plane in accordance with the rotation of the drum 1. As the bucket (not shown) is raised on its rocker arm (not shown), the latter, as it rolls on its path, contacts the lever 31 and forces it downwards thus urging the transverse member 14 to its extreme forward position. By virtue of the cooperation between the roller 12 and the transverse member 14, the crank 5, drum 1 and turntable 2 are all centralised.

I claim:

1. A centralising and traversing device for a rocker shovel of the type in which the rocker arm is carried by a horizontal turntable rotatably mounted on a main frame, said device comprising a flanged drum rotatably mounted on the turntable on a vertical axis; a rope coiled round the drum and having its ends secured to the frame at opposite sides thereof; means for rotating the drum to traverse the turntable in the horizontal plane; a crank mounted concentric with the drum and rotatable therewith, said crank being arranged to lie on the longitudinal axis of the shovel when the turntable is centralised; a roller rotatably mounted on a vertical axis on the free end of the crank; a centralising framework co-operating with the aforesaid roller and movable longitudinally relative to the main frame; and lever means actuated by the rocker arm to urge the centralising framework forward to centralise the crank and therefore the rope drum and turntable.

2. A device, according to claim 1, in which the means for rotating the drum comprises a chain wheel mounted co-axially with the drum and rotatable therewith, and a manually rotatable sprocket wheel mounted on the turntable, the sprocket and chain wheels being connected by an endless sprocket chain.

3. A device, according to claim 1, in which the centralising framework comprises a pair of parallel arms united at their forward ends by a transverse member which co-operates with the roller, the rearward ends of said arms being provided with vertically disposed slots; and in which the framework is moved longitudinally relative to the main frame by structure comprising a transverse shaft mounted on the turntable, crank arms carried by the shaft, crank pins on the crank arms which fit into the aforesaid slots, and lever means connected to the shaft and actuated by the rocker arm to rotate the shaft, throw the crank arms forward and extend the centralising framework forward to the limit of its travel to allow the transverse member to centralise the crank mounted concentric with the drum.

References Cited in the file of this patent

UNITED STATES PATENTS

| Number | Name | Date |
|---|---|---|
| 378,903 | Phelps | Mar. 6, 1888 |
| 387,608 | Vogel | Aug. 7, 1888 |
| 1,389,021 | Vest | Aug. 30, 1921 |
| 2,559,733 | Pitman et al. | July 10, 1951 |